(12) United States Patent
Jokiranta et al.

(10) Patent No.: US 10,525,475 B2
(45) Date of Patent: Jan. 7, 2020

(54) TIGHTENING MEMBER, TIGHTENING DEVICE, JAW CRUSHER, PROCESSING PLANT OF MINERAL MATERIAL AND METHOD FOR ADJUSTING TIGHTNESS OF WEAR PART

(71) Applicant: Metso Minerals, Inc., Helsinki (FI)

(72) Inventors: Jukka Jokiranta, Lempäälä (FI); Aleksi Rikkonen, Tampere (FI)

(73) Assignee: Metso Minerals, Inc., Helsinki (FI)

(*) Notice: Subject to any disclaimer, the term of this patent is extended or adjusted under 35 U.S.C. 154(b) by 477 days.

(21) Appl. No.: 15/100,843

(22) PCT Filed: Nov. 28, 2014

(86) PCT No.: PCT/FI2014/050929
§ 371 (c)(1),
(2) Date: Jun. 1, 2016

(87) PCT Pub. No.: WO2015/082765
PCT Pub. Date: Jun. 11, 2015

(65) Prior Publication Data
US 2016/0303569 A1    Oct. 20, 2016

(30) Foreign Application Priority Data
Dec. 5, 2013   (FI) ................................ 20136229

(51) Int. Cl.
*B02C 1/02*    (2006.01)
*F16F 1/12*    (2006.01)

(52) U.S. Cl.
CPC ............... *B02C 1/02* (2013.01); *F16F 1/121* (2013.01); *B02C 2210/02* (2013.01)

(58) Field of Classification Search
CPC ........... B02C 1/005; B02C 1/02; B02C 1/025; B02C 1/04; B02C 1/06; B02C 1/08;
(Continued)

(56) References Cited

U.S. PATENT DOCUMENTS 2,177,524 A * 10/1939 Gruender ................ B02C 1/02
                                                     241/264
2,257,166 A *  9/1941 Fisher ..................... B02C 1/00
                                                     100/257
(Continued)

FOREIGN PATENT DOCUMENTS

CN    202155206 U    3/2012
CN    202155207 U    3/2012
(Continued)

OTHER PUBLICATIONS

Office Action for Finnish Priority Application No. 20136229 dated Aug. 8, 2014.
(Continued)

*Primary Examiner* — Shelley M Self
*Assistant Examiner* — Katie L. Parr
(74) *Attorney, Agent, or Firm* — Andrus Intellectual Property Law, LLP

(57) ABSTRACT

A method is described for adjusting the tightness of a wear part fastened to a fixed jaw and/or a moving jaw of a jaw crusher with a tightening device that has a screw fastened at its first end in connection with a wear part located on a first side of the jaw; and a tightening member fastened to a second end of the screw on a second side of the jaw; and a spring arranged between the jaw and the tightening member. The spring is compressed or decompressed with the tightening member; the spring is influenced by at least two moving screws supported by a frame of the tightening member. The length of the spring is changed by rotating the at least two moving screws.

13 Claims, 4 Drawing Sheets

(58) Field of Classification Search
CPC ......... B02C 1/10; B02C 2210/02; B02C 1/00;
E21F 13/002; B30B 9/3082; B30B 9/322;
B30B 15/062; F16B 5/02; F16B 5/0241;
F16B 5/025; F16B 5/0266; F16B 5/0283;
F16B 2005/0678; F16B 2/065
USPC ......... 241/286, 198.1, 262, 197, 300, 285.1,
241/290, 283, 316; 100/233, 264, 295,
100/283, 285.1, 290; 248/316.1, 316.2,
248/316.4, 316.6, 316.8
See application file for complete search history.

(56) References Cited

U.S. PATENT DOCUMENTS

| | | | | |
|---|---|---|---|---|
| 2,326,215 | A | * | 8/1943 | Gruender .................. B02C 1/04 241/264 |
| 3,153,512 | A | | 10/1964 | Polzin |
| 3,638,870 | A | | 2/1972 | Bourne et al. |
| 4,181,266 | A | * | 1/1980 | Georget .................. B02C 1/025 241/264 |
| 5,031,531 | A | * | 7/1991 | Becker ................ B41F 13/0008 101/230 |
| 5,110,058 | A | * | 5/1992 | Rawson .................. B02C 1/005 241/264 |
| 2006/0273209 | A1 | * | 12/2006 | Parham .................. B02C 15/04 241/121 |

FOREIGN PATENT DOCUMENTS

| | | | |
|---|---|---|---|
| CN | 202460699 U | 10/2012 | |
| EP | 1908983 | 4/2008 | |
| GB | 1040924 A * | 9/1966 | ............. B02C 1/04 |
| GB | 2444218 | 5/2008 | |
| JP | S5339212 U1 * | 4/1978 | |
| JP | S5339212 U1 | 4/1978 | |
| JP | 2003-211014 A | 7/2003 | |
| JP | 2004167443 A | 6/2004 | |

OTHER PUBLICATIONS

International Search Report for International Application No. PCT/FI2014/050929 dated Mar. 23, 2015.
Written Opinion for International Application No. PCT/FI2014/050929 dated Mar. 23, 2015.
Office Action for Chinese Patent Application No. 201480066525.3 dated Nov. 27, 2017.
Office Action for Japanese Patent Application No. 2016-535237 dated Aug. 20, 2018.
Notice of Allowance for Japanese Patent Application No. 2016-535237 drafted Mar. 28, 2019.

* cited by examiner

TIGHTENING MEMBER, TIGHTENING DEVICE, JAW CRUSHER, PROCESSING PLANT OF MINERAL MATERIAL AND METHOD FOR ADJUSTING TIGHTNESS OF WEAR PART

TECHNICAL FIELD

The invention is related to the tightening of a wear part fastened to a jaw crusher.

BACKGROUND

Mineral material, such as rock, can be extracted from the ground for crushing either by explosions or excavation. The rock may also be natural stone and gravel, or construction waste. Both mobile crushers and stationary crushing applications are used for crushing. The material to be crushed is fed with an excavator or wheel loader to a feed hopper of a crusher or crushing plant, from where the material to be crushed may fall into the throat of the crusher, or a feeder transfers the rock material towards the crusher. The mineral material to be crushed may also be recyclable material, such as concrete, bricks, or asphalt.

Jaw crushers are suitable for, for example, rough crushing at quarries or crushing of construction material. According to the operating principle of the jaw crusher, crushing takes place against jaws, termed fixed and moving jaw.

In a known jaw crusher, a pendulum, or the moving jaw, is supported at its upper end by side plates of the jaw crusher's frame through an eccentric. A rear part of the jaw crusher's frame is fastened between the side plates. Below the eccentric, the pendulum is supported by the rear part of the frame through a toggle plate. The moving jaw is moved back and forth against the fixed jaw located at a front end of the jaw crusher and fastened to the side plates of the frame. Replaceable wear parts are fastened to the fixed and moving jaw.

The wear part is usually fastened to the jaw with a screw positioned through the jaw, tightened from a side of the jaw opposite to the fastening location of the wear part.

One way is to use a screw with threads at both ends, a first end of which is supported by the jaw on a first side of the jaw through a wedge, for example, and on a second side of the jaw, a spring and a nut are placed on the screw, with which the wear part is tightened under spring loading. Tightening the spring is difficult in the cramped space behind the jaw of the crusher. Tightening requires great forces and large tools that are difficult to move in the cramped space. Tightening is slow, because it is only possible to tighten the nut a small amount at a time with a large tool. The wear part settles in its place at the start of crushing and during it, whereby the fastening of the screw becomes loosened, and the nut has to be tightened during use. Tightening interrupts the process.

The purpose of the invention is to avoid or mitigate problems related to prior art and/or offer new technical alternatives.

SUMMARY

According to a first aspect of the invention, a method is provided for adjusting the tightness of a wear part fastened to a fixed jaw and/or moving jaw of a jaw crusher with a tightening device that comprises a screw fastened at a first end thereof in connection with a wear part located on a first side of the jaw; and a tightening member fastened at a second end of the screw on a second side of the jaw; and a spring arranged between the jaw and the tightening member; and the spring is compressed or decompressed with the tightening member; the spring is influenced by at least two moving screws supported by a frame of the tightening member; and the length of the spring is changed by rotating said at least two moving screws. Preferably, the moving screws are rotated alternately.

Preferably, the tightening member is locked in place on the screw with a nut.

Preferably, the rotation of the moving screws and/or nut is prevented by a locking part.

Preferably, the tightening member is moved along the screw by hitting at least two radial extensions formed at a periphery of the tightening member.

Preferably, a spacer plate is arranged between the spring and the tightening member; and a spring cup around the spring, and the tightness of the spring is adjusted so that a frontal surface of the spacer plate is axially at the same height as a frontal surface of the edge of the spring cup.

Preferably, the need to adjust the spring is identified by comparing the mutual locations of the spacer plate and the frontal surface of the spring cup.

Preferably, the tightness of the spring is visually inspected through an area between the radial extensions formed in the tightening member.

Preferably, when the spring is compressed, the moving screws are rotated in a first direction for a distance required by the compression of the spring. Preferably, when the spring is compressed, it is ensured that the moving screws have a sufficient moving distance in a front direction of the movement range to compress the spring.

Preferably, when the spring is decompressed, the moving screws are rotated in a second, opposite direction for a distance required by the decompression of the spring.

Preferably, the diameter of the thread of the moving screw is smaller than the diameter of the thread of the screw.

According to a second aspect of the invention, a tightening member is provided for adjusting the tightness of a wear part fastened with a screw to a fixed jaw and/or moving jaw of a jaw crusher, which screw is fastenable at a first end thereof in connection with the wear part located on a first side of the jaw; and the tightening member is fastenable to a second end of the screw on a second side of the jaw for compressing or decompressing a spring arranged between the jaw and the tightening member, and the tightening member comprises a frame and at least two moving screws supported by the frame for adjusting the length of the spring.

Preferably, the frame of the tightening member is defined therebetween by an upper surface, a lower surface directed in an opposite direction, a circumferential surface combining the upper and the lower surface, and the following penetrating the upper and lower surface are formed in the frame: a middle hole for the screw; and threaded holes for the corresponding moving screws.

Preferably, the tightening member comprises at least two radial extensions at a periphery thereof.

Preferably, the cross section of the frame of the tightening member is star-like, and the extension corresponds to the point of the star.

Preferably, a recess formed between two extensions in the frame of the tightening member allows seeing below the tightening member between the two extensions at such a radial distance from the middle hole formed in the frame of the tightening member which distance corresponds to the radial distance of the moving screw from the middle hole.

Preferably, the moving screws are located in the area of the extensions.

According to a third aspect of the invention, a tightening device is provided that comprises a tightening member for adjusting the tightness of a wear part fastened with a screw to a fixed jaw and/or a moving jaw of a jaw crusher, which screw is fastenable at a first end thereof in connection with the wear part on a first side of the jaw; and the tightening member is fastenable to a second end of the screw on a second side of the jaw for compressing or decompressing a spring arranged between the jaw and the tightening member, and the tightening device comprises the tightening member according to an aspect or embodiment of the invention, which tightening member comprises a frame and at least two moving screws supported by the frame for adjusting the length of the spring.

Preferably, the tightening device comprises a nut for locking the tightening member on the screw.

Preferably, the tightening device comprises a locking part configured to prevent the rotation of the moving screws and/or the nut in relation to the tightening member.

Preferably, the tightening device comprises a spacer plate arranged between the spring and the tightening member; and a spring cup arranged around the spring, and the length of the spring when compressed is arranged to be such that a frontal surface of the spacer plate is axially located at the same height as a frontal surface of the edge of the spring cup.

Preferably, the diameter of the thread of the moving screw is smaller than the diameter of the thread of the screw.

According to a fourth aspect of the invention, a jaw crusher is provided that comprises a fixed jaw and a moving jaw and at least one tightening device that comprises a tightening member for adjusting the tightness of at least one wear part fastened with a screw to the fixed jaw and/or moving jaw of the jaw crusher, which screw is fastened at a first end thereof in connection with a wear part located on a first side of the jaw; and the tightening member is fastened to a second end of the screw on a second side of the jaw for compressing or decompressing a spring arranged between the jaw and the tightening member, and the jaw crusher comprises the tightening device according to an aspect or embodiment of the invention.

According to a fifth aspect of the invention, a processing plant of mineral material is provided that comprises a jaw crusher according to an aspect or embodiment of the invention.

Preferably, the processing plant of mineral material is a mobile processing plant.

Various embodiments of the present invention will only be or have only been described in connection with one or some of the aspects of the invention. A person skilled in the art will appreciate that any embodiment of an aspect of the invention may be applied in the same aspect and other aspects alone or in combination with other embodiments.

BRIEF DESCRIPTION OF THE FIGURES

The invention will be described in the following by way of example with reference to the appended drawings.

DETAILED DESCRIPTION

In the following description, like references refer to similar parts. It should be noted that the figures are not to scale in all cases and that they mainly serve the purpose of illustrating embodiments of the invention.

Figure 1:
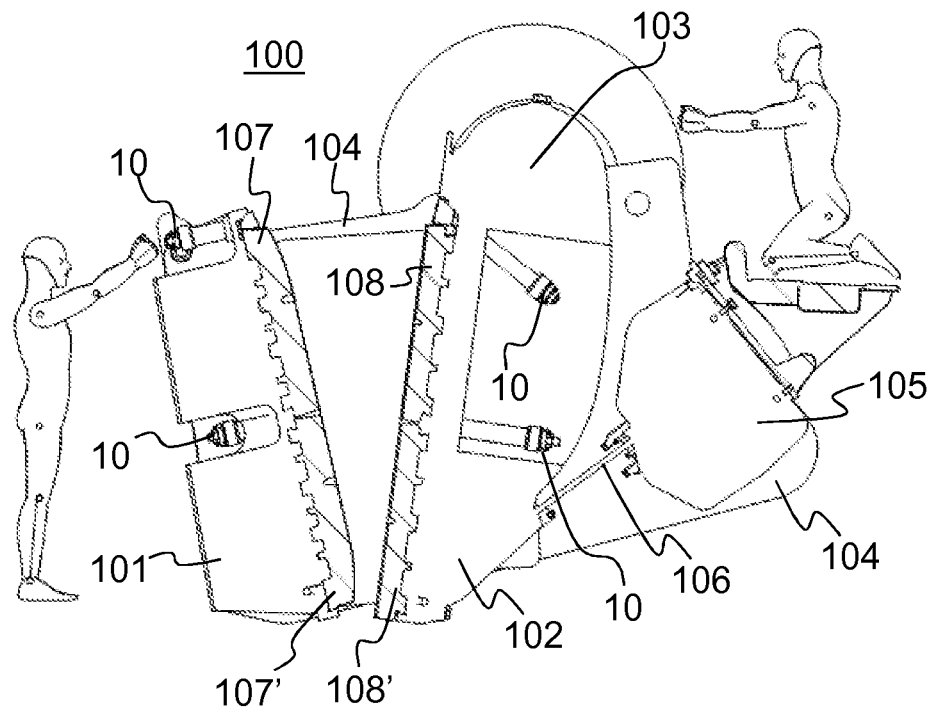
FIG. 1 shows a longitudinal cross section of a jaw crusher where a tightening device according to the invention is used for fastening its wear part.

FIG. 1 schematically shows a jaw crusher 100 that comprises a fixed jaw 101 as a front part of the jaw crusher and a pendulum 102 supported at its upper end by side plates 104 of the jaw crusher's frame through an eccentric 103. A rear part 105 of the jaw crusher's frame is fastened between the side plates. The pendulum is supported below the eccentric by the rear part of the frame through a toggle plate 106. The pendulum is moved back and forth against the fixed jaw 101 located at a front end of the jaw crusher and fastened to the side plates 104 of the frame.

An upper wear part 107 and a lower wear part 107' are fastened to the fixed jaw, and, correspondingly, an upper wear part 108 and a lower wear part 108' are fastened to the pendulum. The tightening device 10 is used for fastening the wear parts.

Figure 2:
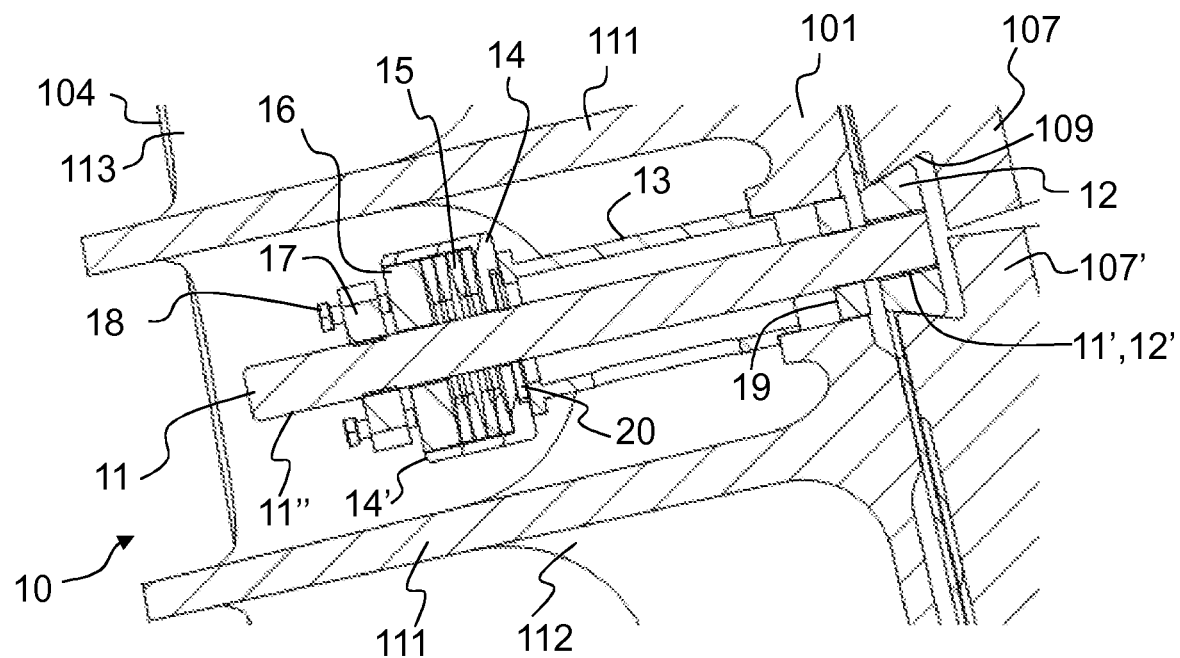
FIG. 2 shows a cross section of a first preferred tightening device fastened to the crusher in FIG. 1.

FIG. 2 shows a part of the jaw crusher 100 and tightening device 10 in FIG. 1 in more detail in a longitudinal cross section along the middle line of the tightening device. The fixed jaw 101 is used as an illustrative example of one positioning of the tightening device. Naturally, the tightening device 10 may also be used in connection with the pendulum 102.

In FIG. 2, the jaw crusher's fixed jaw 101 comprises horizontal fins 111 and vertical fins 112 functioning as stabilizers. The fixed jaw 101 also comprises side walls 113, where the fixed jaw is fastened to the side plates 104. The structure of the jaw crusher's jaw is not intended to limit the invention; it only illustrates one possible operating environment of the tightening device.

The tightening device 10 comprises a screw 11 transmitting the tightening force to the wear part 107, 107'. In FIG. 2, the wear parts 107, 107' are tightened against a first side of the jaw 101 with the screw 11 positioned through the jaw and tightened from a second side of the jaw. The number of wear parts per jaw is not intended to limit the invention. The screw may be threaded at its both ends. A first end 11' of the screw 11 is supported by the jaw on the first side of the jaw through a wedge 12. The screw 11 is fastened to the wedge 12. The wedge is arranged in a known manner in contact with a counter surface 109 formed in the wear part. The fastening of the screw 11 to the wear part is intended as an example, and not as a limitation of the invention.

The tightening device 10 comprises a spring 15 and a tightening member 17 fastened to a thread formed at a second end 11" of the screw. The spring 15 preferably comprises plate springs. The spring may be a coil spring. The spring may be of contracting material that has a spring property. The spring may be an elastomeric object. The spring may consist of a number of objects. The overall compression of the spring, such as plate springs, is 6.5 mm according to one example. According to an example, the nominal diameter of a male thread formed at the second end 11" of the screw and a corresponding female thread of the tightening member 17 is 36 mm. The tightening member 17 may be moved along the thread formed at the second end 11" of the screw. When the tightening member is moved towards the jaw, the tightening member allows contracting the spring 15 (i.e., compressing the spring 15) between the tightening member and the second side of the jaw crusher's jaw when the screw 11 is fastened at its first end 11' in connection with the wear part on the first side of the jaw. Correspondingly, when the tightening member is moved away from the jaw, the tightening member allows decompressing the spring 15.

The tightening member 17 comprises at least two moving screws 18 arranged in an adjustable manner in the frame 17F of the tightening member. The moving screws may be moved in relation to the frame 17F of the tightening member by rotating the operating ends of the moving screws 18 from the direction of the second end 11" of the screw 11, i.e., from the same direction as the tightening member itself. The moving screws 18 are arranged to compress the spring 15 from an outer end of the spring when the wear part is fastened with the tightening device 10. The distance between the frame 17F of the tightening member 17 and the outer end of the spring 15 is arranged to be changeable by rotating the at least two moving screws 18 supported by the tightening member. Preferably, the moving screws are rotated alternately. The moving screws 18 may be moved in the same directions of movement as the tightening member 17, i.e., towards the jaw 101 when the spring is compressed and away from the jaw when the spring is decompressed. According to an example, the nominal diameter of the thread of the moving screw 18 is 12 mm.

The insight of the invention is to make it easier to compress and decompress the spring 15, because the compression of the spring may be adjusted as required by rotating the tightening member 17 in the thread of the screw 11 and/or rotating the at least two moving screws 18 of the tightening member 17 in threads formed in the frame 17F of the tightening member. Preferably, the diameters of the threads of the moving screws 18 are smaller than the diameter of the thread of the screw 11. Thus, moving the moving screws when under spring loading and, in some cases, stuck (e.g., due to dirt in the thread or deformation of the thread) is easier than moving the entire tightening member when under spring loading and, in some cases, stuck (e.g., due to dirt in the thread or deformation of the thread) along the screw 11 with a larger diameter.

The insight of the invention is to divide a large load into smaller partial loads, whereby the forces used for adjusting the spring 15 and the size of the tools decrease. In particular, with the invention, the opportunity to use smaller tools makes it easier to adjust the spring within the cramped fin structure of the jaw.

In some cases, the tightening device 10 comprises a bushing 13 arranged between the spring 15 and the jaw 101. The handling of the tightening device may be made easier by bringing the handling part of the tightening device, such as the tightening member 17 and/or the moving screws 18, further out from inside the jaw by means of a bushing. However, the bushing is not necessary for the tightening device according to the invention, and according to some preferred embodiments of the invention, the bushing may be omitted, in which case an inner end of the spring 15 can be supported in relation to the jaw without the bushing.

Preferably, the tightening device 10 comprises a spacer plate 16 arranged between the outer end of the spring 15 and the tightening member 17. The spacer plate 16 is pressed with the frame 17F of the tightening member 17 (moving screws' ends drawn inside the frame 17F) or the ends of the moving screws 18 towards and against the outer end of the spring. Preferably, the spacer plate is made of hard material. The spacer plate allows reducing the deformation of material taking place at the contact points of the moving screws' ends and prevents the moving screws from becoming bent.

Preferably, the tightening device 10 comprises a spring cup 14, which is arranged between the spring 15 and the jaw 101 and surrounds the spring in the radial direction. In some cases, a bushing 13 is arranged between the spring cup 14 and the jaw 101. The spring cup allows protecting the springs and preventing access of foreign objects and dirt into the spring 15. Preferably, spring washers are centered on the spring cup at their periphery, and the spring cup is centered on the screw 11 through a hole at the bottom of the spring cup.

Preferably, the tightening device 10 comprises a first alignment part 19 and/or a second alignment part 20 which facilitate positioning the screw in a suitable location. Said alignment parts comprise middle holes where a small play allows the screw 11 to move back and forth. The first alignment part 19 is arranged in an opening formed in the jaw 101, and it enables supporting the upper wear part 107 at roughly its future fastening height by the screw 11 and the wedge 12. The second alignment part 20 is arranged between a potential bushing 13 and the spring cup 14. The second alignment part 20 enables centering the spring cup 14 and preferably the screw 11 on the bushing 13. In this way, positioning of the screw perpendicularly in relation to a front surface of the jaw 101 may be facilitated.

The insight of the invention is to improve the fastening process of the wear part during the installation of the wear part and the use of the crusher. The adjustability of the fastening of the wear part can be improved. The fastening process includes the adjustment of the tightness of the spring during installation and use. In some preferred embodiments of the tightening device, the tightening device allows adjusting the tightness of the spring to a correct value based to a larger extent on visual observations.

Preferably, the spring cup 14, the spring 15, and the spacer plate 16 are dimensioned and arranged to function in cooperation so that when the spring is suitably tight, preferably fully compressed, an outer frontal surface of the spacer plate 16 installed against the outer end of the spring is axially located at the same height as a frontal surface 14' of the edge of the spring cup. When the spring 15 has loosened due to the moving of the wear part 107, 107' towards the jaw 101 and/or the moving of the wear part vertically farther away from the screw 11 and/or the moving of the screw in relation to the wear part, the spacer plate 16 moves axially outwards in the spring cup 14, and the circumferential surface of the spacer plate located in a radial direction comes out from behind the edge of the spring cup. This functions as a visual indication of the tightness status of the tightening device and the spring for the user, and indicates to the user that the spring needs to be adjusted.

Figure 3:
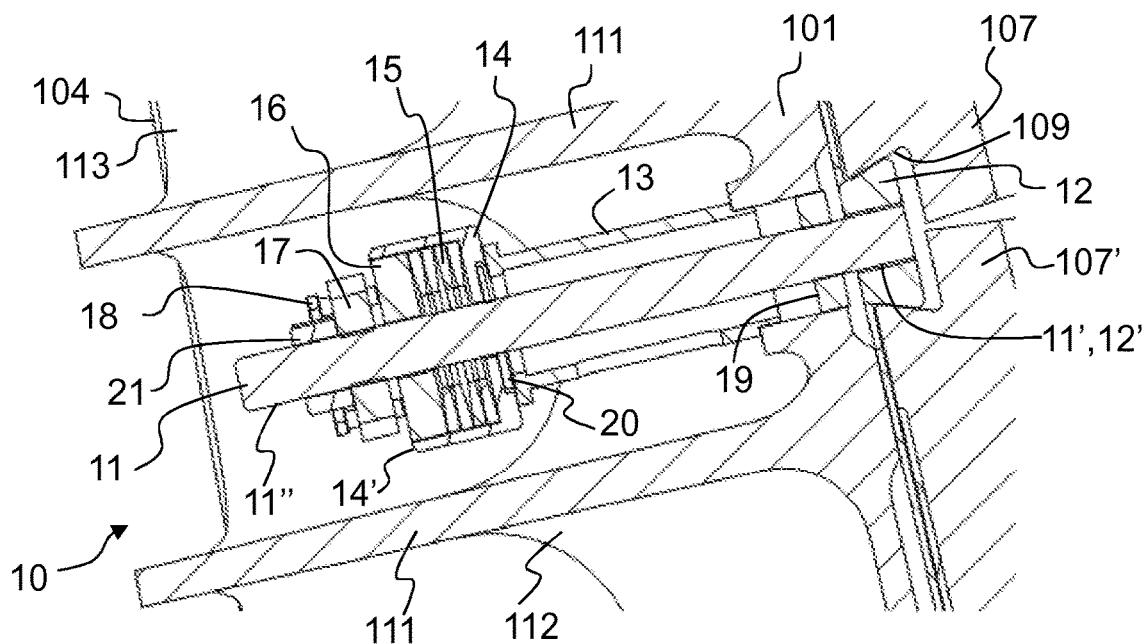
FIG. 3 shows a cross section of a second preferred tightening device fastened to the crusher in FIG. 1.

A second preferred embodiment of the tightening device 10 presented in FIG. 3 comprises in addition to FIG. 2 a fastening nut 21 installed on the screw 11, by means of which the tightening member 17 can be locked in relation to the screw. In the case of FIG. 3, the tightening member 17 need not necessarily have an independent thread connection with the screw 11, because in some embodiments, the tightening member can be prevented from moving backwards by means of a nut.

In the case that the tightening member is equipped with a female thread cooperating with the thread of the screw 11, the tightening member can be locked in place on the screw by the nut 21. In this case, the rotation of the tightening member 17 at its place may also be prevented by means of the nut 21.

Figure 4:
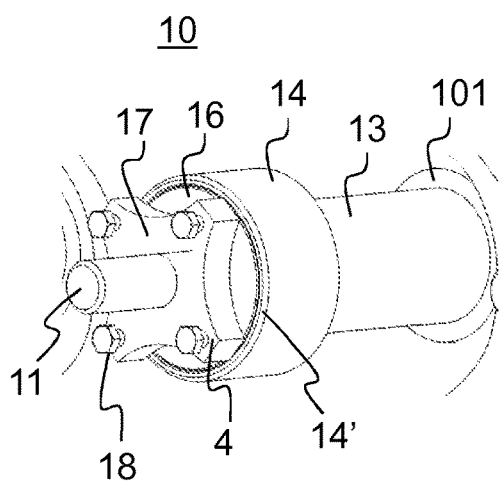
FIG. 4 shows a perspective view of the tightening device in FIG. 2.
Figure 5:
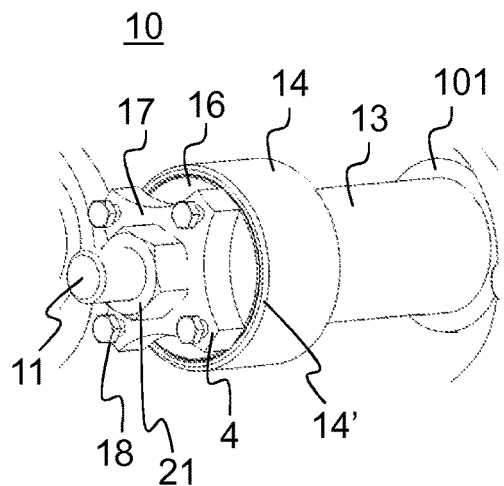
FIG. 5 shows a perspective view of the tightening device in FIG. 3.

FIGS. 4 and 5 show perspective views of the parts in FIGS. 2 and 3 installed in the crusher's jaw 101. FIGS. 4 and 5 illustrate some examples of the tightening device 10 and the tightening member 17 from outside the jaw, from the point of view of the crusher's user and mechanic. The tightness status of the tightening device 10 and the spring 15 can be seen by comparing the mutual positions of the spacer plate 16 and the frontal surface 14' of the spring cup. When the spring located protected inside the spring cup is more extended than desired, for example, due to the decompression of the spring after the original tightening, the tightness of the spring can be adjusted in the ways explained above. Preferably, the visible frontal surface of the spacer plate 16 is adjusted to the height of the frontal surface 14' of the spring cup 14 by rotating the at least two moving screws 18 arranged in the tightening member 17.

FIGS. 4 and 5 illustrate a preferred example of the design of the tightening member 17, which enables a visual inspection of the tightness of the spring. The solution invented for inspecting the tightness from behind the tightening member is designing the tightening member to have radial extensions 4. More examples of the extensions 4, 4', 4", 4'", 4"" are shown in FIGS. 6, 8, 9, and 10. The tightening member 17 comprises at least two radial extensions 4 at its periphery, and the location of the visible frontal surface of the spacer plate 16 in relation to the frontal surface 14' of the spring cup 14 can be clearly visually determined through areas formed between the extensions outside the tightening member. Preferably, the design of the tightening member 17 enables locating the moving screws 18 sufficiently far from the screw 11 in the area of the extension 4, so that it is possible to grab the head of the moving screw 18 with a rotating tool. At the same time, the deeper area between the extensions 4 in the direction of the radius of the tightening member's frame enables the aforementioned visual inspection.

FIGS. 4 and 5 illustrate a preferred example of the design of the tightening member 17 which enables rotating the tightening member and moving it along the screw by hitting. The solution invented for a case where the tightening member becomes stuck in the thread of the screw 11, i.e., a case of an increased rotating momentum, as a result from being under spring loading and/or from the thread being dirty, is to have the design of the tightening member include radial extensions which can be directly hit with a hammer. In this case, a separate hitting tool, which should be installed and kept in place, is not needed between the tightening member and the hammer. The radial extensions may be used for loosening the tightening member 17 also when the spring 15 is under a load.

Figures 6, 7:
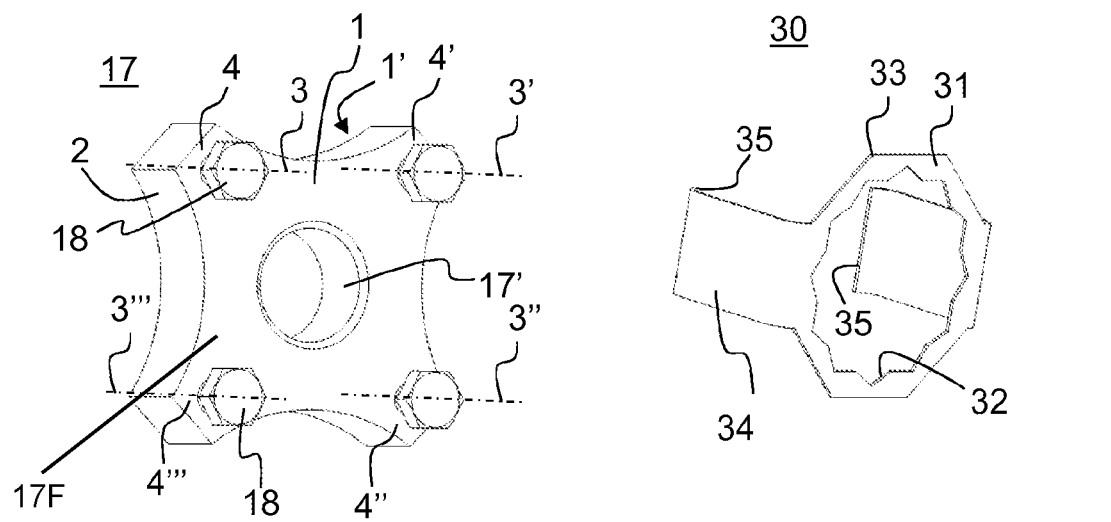
FIG. 6 shows a first tightening member that has four radial extensions and moving screws at its periphery.
FIG. 7 shows a locking part for the tightening member in FIG. 6.

FIG. 6 shows a first tightening member 17 that comprises four radial extensions 4, 4', 4", 4'" and four moving screws 18. The tightening member comprises a frame 17F defined inside them by an upper surface 1, a lower surface 1' directed in an opposite direction, and a circumferential surface 2 combining the upper and the lower surface. A middle hole 17' is formed in the frame 17F; in preferred embodiments a female thread is formed in this hole, which is to be fitted to a male thread of the screw 11 of the tightening device. The extensions significantly radially protruding from a middle area of the frame 17F may be called points. Preferably, the cross section of the tightening member's frame is star-like, and the extension then corresponds to the point of the star. The tightening member 17 comprises threaded holes 3, 3', 3", 3'" for the corresponding moving screws 18. Preferably, the threaded holes are located in the area of the extensions. Preferably, the threaded hole of the moving screw is integrated in the frame 17F of the tightening member. Threaded holes may also be arranged in a nut supported by the frame 17F of the tightening member (not shown in the figures).

The need for adjusting the spring of the tightening device 10 can be clearly visually determined through radial recesses formed in the circumferential surface 2 between the extensions of the tightening member 17. Said recesses allow seeing and visually inspecting below the tightening member 17 between the extensions and preferably at such a radial distance from the middle hole 17' that corresponds to the radial distance of the moving screw 18 from the middle hole.

FIG. 7 shows and example of a locking part 30 for the tightening member 17 in FIG. 6. The locking part is intended to prevent the rotation of the moving screws 18 and/or the nut 21. In this example, the locking part comprises a plate-like frame 31 in the middle of which a locking opening 32 is formed. The form of the locking opening is determined according to an outer surface of the nut 21 used in the tightening device 10 so that the nut becomes locked in the locking opening at least in one position. In FIG. 7, the locking opening comprises 12 positions for a hexagonal nut.

The frame 31 comprises an outer edge 33 which, when fitted against the head of a moving screw 18, prevents the moving screw from rotating. The locking part comprises axial fastening arms 34 fastened to the frame, and fastening claws 35 arranged in them that extend below a lower surface 1' of the locking part and keep the locking opening 32 and the outer edge 33 at the correct locking height in relation to locking screws and the nut.

Figures 8, 9:
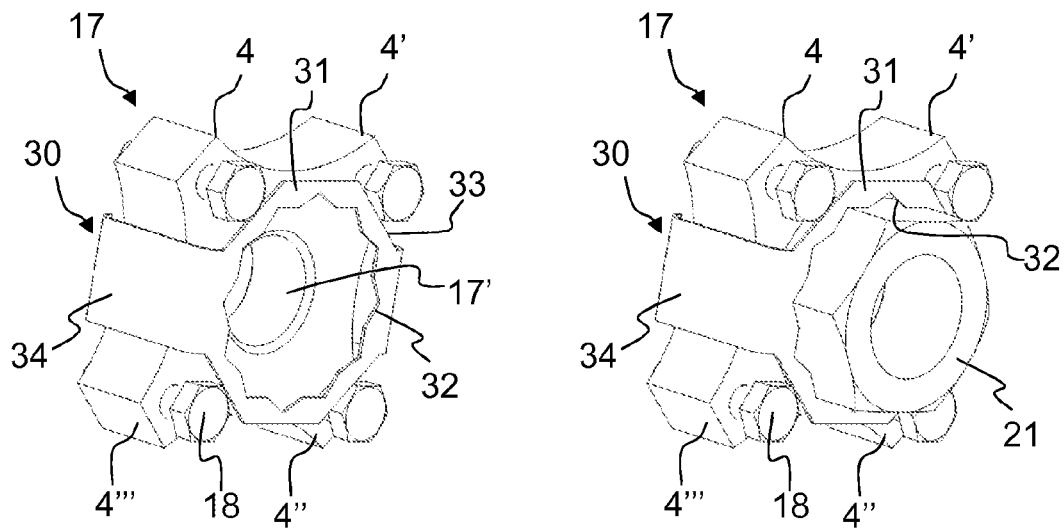
FIG. 8 shows the tightening member in FIG. 6 equipped with the locking part in FIG. 7.
FIG. 9 shows the tightening member in FIG. 6 equipped with the locking part in FIG. 7 and a nut.

FIG. 8 shows the tightening member 17 equipped with the locking part 30. The heads of the moving screws 18 do not have room to bypass the outer edge 33 of the frame of the locking part 30, and the rotation of the moving screws is prevented. FIG. 9 shows the tightening member equipped with the locking part and a nut 21, the rotation of which is prevented with the locking opening 32.

Figure 10:
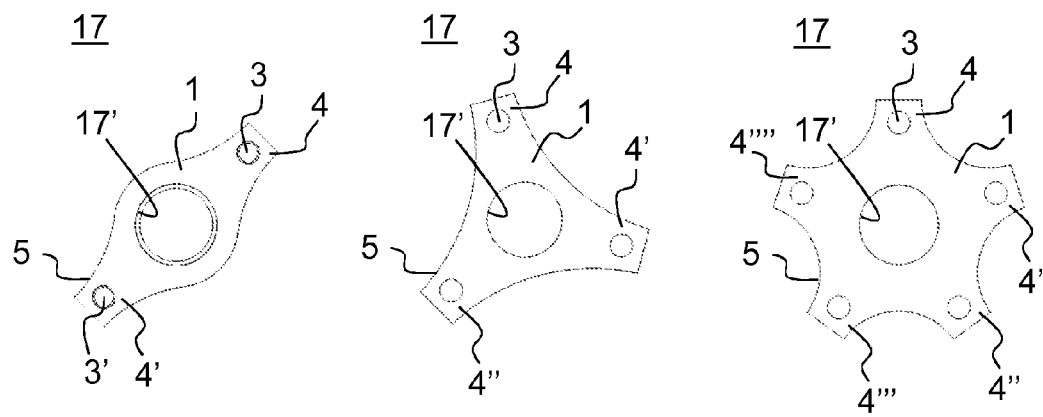
FIG. 10 shows alternative embodiments of the tightening member which include a varying number of extensions.

FIG. 10 shows alternative embodiments of the tightening device 17 that include a varying number of extensions and moving screws. The tightening member on the left has two extensions 4, 4', and the extensions have correspondingly two threaded holes 3, 3' for moving screws 18. The tightening member shown in the middle comprises three extensions 4, 4', 4" and three corresponding threaded holes, and the tightening member on the right has five extensions 4, 4', 4", 4'", 4"" and corresponding threaded holes in the extensions. Side faces 5 are shown to extend between adjacent extensions, wherein the side faces 5 also extend between the upper surface 1 and lower surface 1'. Recesses are formed between the extensions in all the embodiments by virtue of these side faces 5 being concaved, which enable the visual inspection of the spring 15 in the area between the extensions. The extensions may be directly hit with a hammer.

Figure 11:
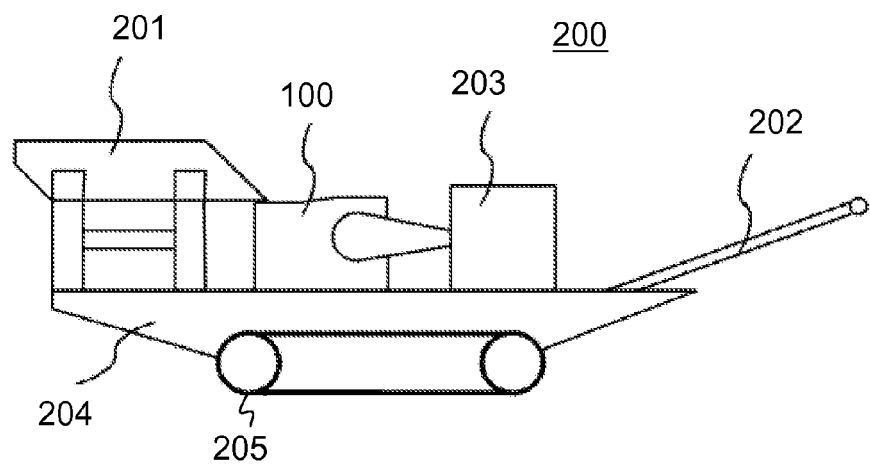
FIG. 11 shows a processing plant of mineral material according to the invention that preferably comprises the crusher in FIG. 1.

FIG. 11 shows a mobile processing plant of mineral material 200 that comprises a feeder 201 for feeding material to a jaw crusher 100 and a belt conveyor 202 for conveying the crushed product farther away from the processing plant. The jaw crusher comprises a tightening device 10 according to an embodiment of the invention for tightening a wear part to a fixed and/or a moving jaw of the crusher. The processing plant 200 also comprises a power supply and a control center 203. The power supply may be a diesel or electric engine, for example, which supplies energy for the use of process units and hydraulic circuits.

The feeder, crusher, power supply, and conveyor are fastened to a frame 204, which in this embodiment also comprises a track base 205 for moving the processing plant. The processing plant may also be entirely or partly wheel-mounted or movable by feet. Alternatively, it may be movable/towable by means of a truck or other external power supply. In addition to those mentioned above, the processing plant may also be a stationary processing plant.

Without limiting the scope of protection, interpretation, or potential applications of the invention, the improvement of occupational safety can be regarded as a technical advantage of the various embodiments of the invention. Furthermore, facilitation of work and ergonomics can be considered a technical advantage of the various embodiments of the invention. Moreover, the reduction of the force needed for tightening can be considered a technical advantage of the various embodiments of the invention. When the tightening device is used, installation forces are smaller than previously. When rotating smaller screws, smaller and lighter tools can be used. Furthermore, the reduction of the space needed for using a tool can be considered a technical advantage of the various embodiments of the invention. In practice, a larger movement can be effected all at once by using a tool, such as a ratchet wrench or ring spanner. The facilitation of noticing the tightness status of the spring used for fastening the wear part can be considered a technical advantage of some embodiments of the invention. Facilitation of the detachment of a stuck tightening member can be considered a technical advantage of some embodiments of the invention. For example, the spring can be decompressed by rotating smaller screws than previously, whereby, after the reduction or removal of the tension of the spring, the tightening member can be more easily rotated with a larger thread of a stud bolt. Enabling the detachment of a stuck tightening member with a hammer can be considered a technical advantage of some embodiments of the invention. The opportunity not to use a bushing, or at least to use a bushing shorter than the one previously used in tightening, can be considered a technical advantage of some embodiments of the invention.

The description presented in the foregoing provides non-limiting examples of some embodiments of the invention. However, it is apparent to those skilled in the art that the invention is not limited to the details presented above, but that the invention may also be implemented in other equivalent ways.

Some features of the embodiments presented may be utilized without employing other features. The above description must be regarded as an explanatory account describing the principles of the invention and not as limiting the invention. Thus the scope of the invention is only limited by the appended claims.

The invention claimed is:

1. A method for adjusting the tightness of a wear part fastened to a jaw of a jaw crusher by a screw fastened at a first end thereof in connection with the wear part located on a first side of the jaw, the method comprising:
    positioning a frame of a tightening member on a second end of the screw;
    compressing and decompressing a spring by moving the frame of the tightening member along the second end of the screw;
    influencing the spring with at least two moving screws supported by the frame of the tightening member; and
    changing the length of the spring by rotating the at least two moving screws relative to the frame.

2. A tightening member for adjusting the tightness of a wear part fastened to a jaw of a jaw crusher by a screw connected at a first end of the screw to the wear part, wherein the first end of the screw is located on a first side of the jaw, the tightening member comprising:
    a frame mounted on a second end of the screw;
    a spring positioned between the jaw and the frame on a second side of the jaw; and
    at least two moving screws supported by the frame, wherein each of the at least two moving screws are movable relative to the frame for adjusting the length of the spring; wherein the screw is fastenable at a first end thereof in connection with the wear part located on a first side of the jaw;
    wherein the tightening member is fastenable to the second end of the screw on a second side of the jaw; and
    wherein the frame of the tightening member is movable along the second end of the screw for compressing or decompressing the spring.

3. The tightening member according to claim 2, wherein the frame of the tightening member is defined therebetween by an upper surface, a lower surface opposite the upper surface, and a circumferential surface combining the upper surface and the lower surface, wherein the frame defines a middle hole configured to receive the second end of the screw and threaded holes configured to receive the at least two moving screws.

4. The tightening member according to claim 2, further comprising at least two radial extensions at a periphery thereof.

5. The tightening member according to claim 4, wherein side walls extend between adjacent extensions of the at least two radial extensions, wherein the tightening member defines a middle hole configured to receive the second end of the screw, and wherein a first radial distance between the middle hole and one of the at least two radial extensions is greater than a second radial distance between the middle hole and one of the side walls.

6. The tightening member according to claim 4, wherein side walls extend between adjacent extensions of the at least two radial extensions, and wherein the side walls are concaved such that a recess is formed between the adjacent extensions, wherein the recess allows for visual inspection of the spring below the tightening member.

7. The tightening member according to claim 4, wherein the at least two moving screws are received within the at least two radial extensions, respectively.

8. The tightening member according to claim 2, further comprising a nut for locking the tightening member on the second end of the screw.

9. The tightening member according to claim 8, further comprising a locking part configured to prevent the rotation of at least one of the nut and the at least two moving screws in relation to the frame of the tightening member.

10. The tightening member according to claim 2, further comprising a spacer plate arranged between the spring and the frame of the tightening member, and further comprising a spring cup arranged around the spring, wherein the length of the spring when compressed is arranged such that a frontal surface of the spacer plate is axially located at the same height as a frontal surface of the edge of the spring cup.

11. The tightening member according to claim 2, wherein the diameter of the thread of each of the at least two moving screws is smaller than the diameter of the thread on the second end of the screw.

12. A jaw crusher wherein the jaw crusher comprises the tightening member according to claim 2.

13. A processing plant of mineral material, wherein the processing plant of mineral material comprises the jaw crusher according to claim 12.

* * * * *